Feb. 16, 1954  R. D. GAMBRILL  2,669,660
LEAK DETECTING APPARATUS
Filed Oct. 27, 1951  3 Sheets-Sheet 1

INVENTOR
R. D. GAMBRILL
BY
ATTORNEY

Feb. 16, 1954    R. D. GAMBRILL    2,669,660
LEAK DETECTING APPARATUS
Filed Oct. 27, 1951    3 Sheets-Sheet 2
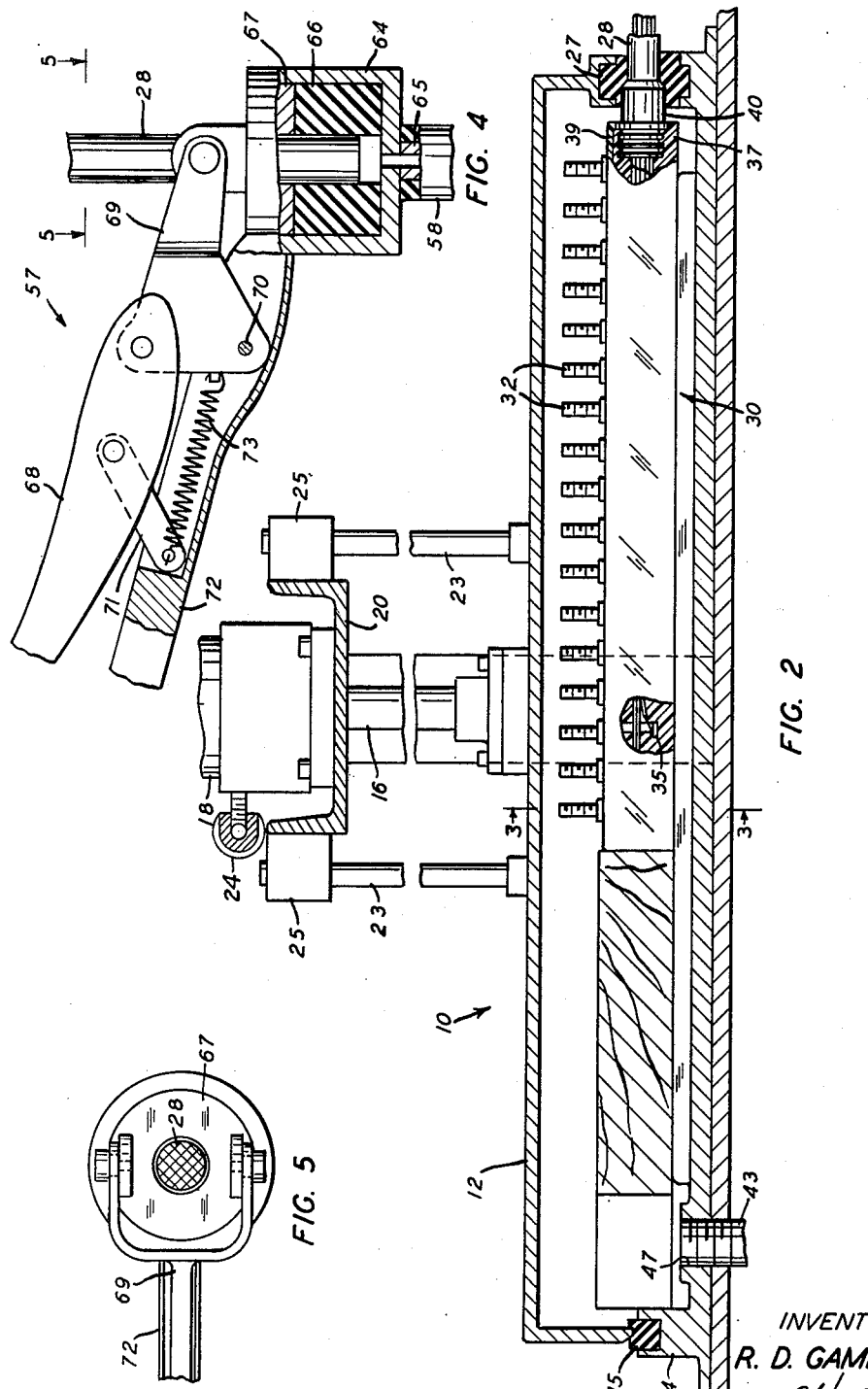
INVENTOR
R. D. GAMBRILL
ATTORNEY

INVENTOR
R. D. GAMBRILL
BY
ATTORNEY

Patented Feb. 16, 1954

2,669,660

UNITED STATES PATENT OFFICE 2,669,660

LEAK DETECTING APPARATUS

Richard D. Gambrill, Baltimore, Md., assignor to Western Electric Company, Incorporated, New York, N. Y., a corporation of New York Application October 27, 1951, Serial No. 253,550

8 Claims. (Cl. 250—41.9)

This invention pertains to leak detecting apparatus, and more particularly to apparatus for detecting leaks in electrical equipment.

In the manufacture of an improved cable terminal assembly, terminal studs and their attached leads are imbedded in a casting resin. The resin, which solidifies into a hard mass, secures these elements in a position within a plastic shell. When such cable terminal assemblies are placed in service in the field, a gas under pressure is introduced into the cable. It is, therefore, essential that there be no voids in the resin through which the gas might escape. This requirement necessitates the use of a leak detector for testing the finished terminal assemblies on a mass production basis.

An object of this invention is to provide new and improved leak detecting apparatus.

Another object of the invention is to provide apparatus for detecting leaks in electrical equipment.

Other objects of the invention will become apparent as the specification proceeds.

An apparatus embodying certain features of this invention may include an envelope for containing an article to be tested, means for evacuating the envelope containing the article, means for introducing a gas into the interior of the article, a detector sensitive to the presence of the gas, and means for connecting the interior of the envelope to the detector to ascertain the presence of any gas which may seep through the article into the envelope.

A complete understanding of the invention may be obtained from the following detailed description of an apparatus forming a specific embodiment thereof, when read in conjunction with the drawings, in which:

Fig. 2 is an enlarged fragmentary section taken approximately along line 2—2 of Fig. 1;

Fig. 4 is a fragmentary view, partly in section of a cable gripping device forming a part of the apparatus;

Fig. 5 is a fragmentary section taken along line 5—5 of Fig. 4, and

Figure 1:
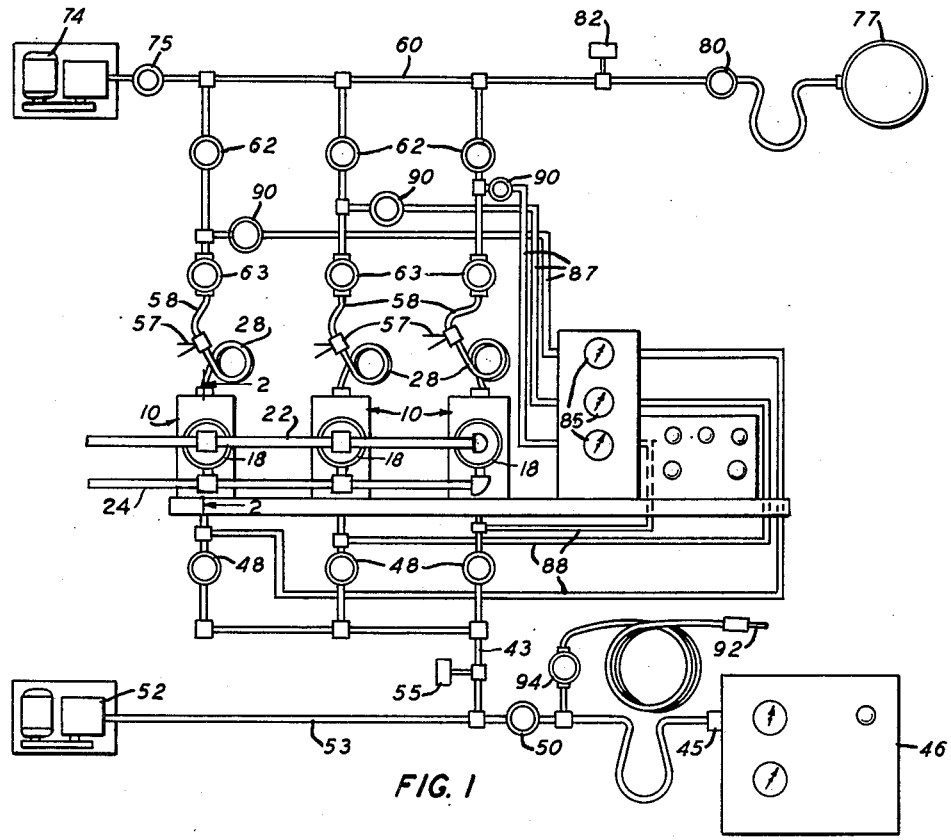
Fig. 1 is a top plan view of a leak detecting apparatus in which some of the parts are represented schematically.

Referring now to the drawings in which there is shown one particular embodiment of the invention, which includes three envelopes 10—10 (Fig. 1) for performing tests simultaneously on three cable terminal assemblies. Each of the envelopes 10—10 comprises a removable hood 12 (Figs. 2 and 3) and a stationary base plate 14. The base plate 14 is provided with a rubber gasket 15, which insures a gas-tight seal between the hood 12 and the base plate 14 when the hood 12 is mounted thereupon.

The hood 12 is operatively connected to a piston 16 of a pneumatic cylinder 18, which is mounted on a support assembly 20. The cylinder 18 is connected at its opposite ends to air lines 22 and 24 may be selectively operated to either raise the hood 12 or lower and clamp it tightly upon the gasket 15 of the base plate 14, thereby effectively forming a gas-tight chamber.

A pair of guide rods 23—23, fixedly secured to the top surface of the hood 12, are slidably received in a pair of guides 25—25 mounted on the support assembly 20. The guide rods 23—23 and guides 25—25 cooperate to prevent any misalignment of hood 12 with respect to the base plate 14. The envelopes 10—10 are each provided at one end with a split bushing 27, which allows a lead sheathed cable stud 28 on a terminal assembly 30 positioned within the envelope for a leak test, to protrude therefrom. The split bushing 27 is made of rubber or like material for the purpose of insuring a gas-tight seal.

Figure 3:
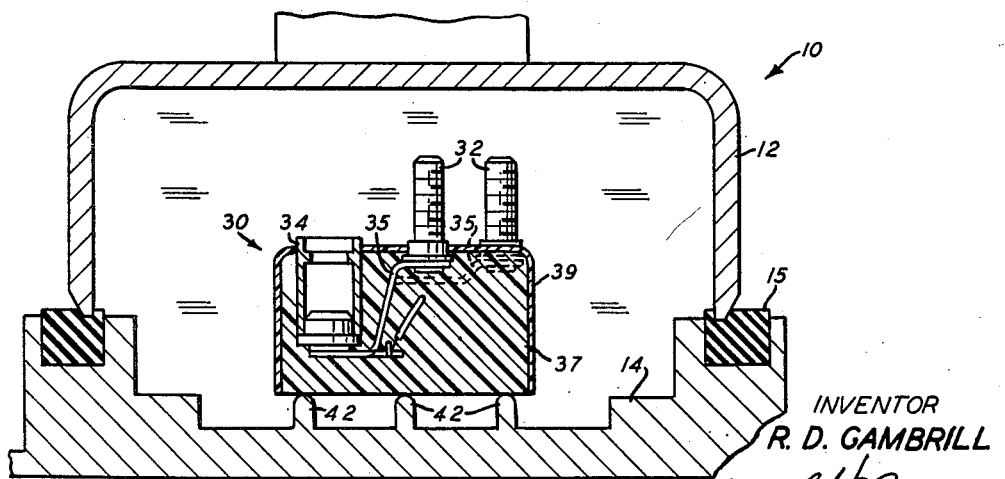
Fig. 3 is an enlarged fragmentary section taken along line 3—3 of Fig. 2.

The terminal assembly 30, illustrated in Figs. 2 and 3, is representative of the type of equipment that may be tested for leaks caused by voids and imperfections. It will be noted that individual elements, such as terminal studs 32—32, fuse wells (only one of which designated 34 is shown) and their connected straps 35—35, are imbedded in a solidified resin 37 which fills a plastic shell 39. The straps 35—35 are electrically connected to the conductors of a lead sheathed cable stud 28, which is soldered to a nipple 40 positioned in one end of the shell 39. Occasionally, the resin 37 does not completely adhere to all the elements, and voids occur in the resin, which would allow a gas filling the cable stub 28 to escape to the atmosphere.

The base plate 14 is provided with a series of spaced longitudinal ribs 42—42, which support a terminal assembly 30 in a manner such that substantially the whole undersurface thereof is exposed for contact with any gas which may be present within the envelopes 10—10. An exhaust line 43 (Fig. 2) communicates with the interiors of each of the envelopes 10—10 through an aperture 47 in each base plate 14. The exhaust line 43 is connected to an intake port 45 on a mass spectrometer 46 through solenoid operated, normally closed valves 48—48 and 50. The valve 50 is provided with a throttling adjustment which may be regulated to allow only the passage of small amounts of gases.

The mass spectrometer 46 is a commercial instrument, which is manufactured by the Consolidated Engineering Corporation, Pasadena 4, California, and is described as Model 24-101A in their brochure (Bulletin CEC-1801B). The instrument has been designed to detect the presence of very minute quantities of helium gas present in the air admitted to its intake port 45. A vacuum pump 52 is connected to the exhaust line 43 by the pipe line 53 at a point intermediate of the valves 48—48 and the valve 50. A pressure actuated switch 55, set to operate when there is vacuum of 29½" of mercury, is located in the exhaust line 43 between the junction of the line 53 and the valves 48—48.

Cable gripping devices 57—57 are attached to flexible hoses 58—58, which in turn are connected to a pipe line 60 through normally closed, solenoid operated valves 62—62 and normally open, manually operated valves 63—63. The cable gripping devices 57—57 are designed to facilitate rapid connections with the cable stubs 28—28 of each terminal assembly 30. Each of the cable gripping devices 57—57 includes a hollow cylindrical chamber 64 (Fig. 4) provided at one end with an apertured nipple 65, a ring 66 of pliable rubber positioned within the chamber and an apertured plunger 67. The plunger 67 is slidably received within the chamber 64 and may be operated, to exert a downward pressure on the upper surface of the ring 66, by depressing a grip 68, which rotates a forked bell crank 69, connected to a plunger 67, clockwise about a pin 70.

The downward pressure on the upper surface of the ring 66 will cause the ring to seal itself about the end of a cable stub 28, that may be inserted therein through the apertured plunger 67. The sealing action provides a gas-tight junction between a flexible hose 58 connected to the nipple 65 and a cable stub 28. The grip 68 is maintained in its depressed position by a toggle arrangement provided on the device 57. The grip 68 is pivotally attached to the forked bell crank 69 and to a toggle arm 71. The lower end of the toggle arm 71 slides in a track provided in a handle 72 secured to the chamber 64 and is connected to the bell crank 69 by a tension spring 73. When the grip 68 has been sufficiently depressed, the toggle arm 71 passes over a dead center position and effectively locks the grip 68 and forked bell crank 69 in a clamping position, with the plunger 67 exerting pressure on the ring 66. To unclamp the device 57 from a cable stub 28, the operator forces the grip 68 and handle 72 apart, overcoming the toggle locking action, to release the pressure exerted on ring 66 by the plunger 67.

A vacuum pump 74 is connected to the pipe line 60, in series with a normally closed, solenoid operated valve 75. Operation of the valve 75 allows any air in the line 60 to be evacuated by means of the pump 74. A tank 77, containing a supply of helium under pressure is connected to line 60 through a normally closed, solenoid operated valve 80, which when actuated simultaneously with valves 62—62, while valve 75 is closed, will permit the helium under pressure to enter the terminal stubs 28—28. A pressure switch 82 in the line 60 is set to operate when the vacuum therein falls to 0" of mercury.

Differential pressure meters 85—85 are designed to indicate the pressure difference between the gas present in the cable stubs 28—28 and that present in the envelopes 10—10. The meters 85—85 are connected to the cable stubs 28—28 and envelopes 10—10 by lines 87—87 and 88—88, respectively. Normally closed, solenoid operated valves 90—90 are included in each of the lines 87—87 for selectively connecting the meters 85—85 for readings of the differential pressure.

A probe 92 for finding the approximate location of a leak in a faulty terminal assembly 30 is connected to the mass spectrometer 46 by a flexible hose in series with a hand operated valve 94, which is normally closed.

A circuit for controlling the various aforementioned valves in their proper sequence, during a test, is shown in Fig. 4. The circuit will be described more fully in conjunction with the following description of the operation of the apparatus. Since the test is usually performed simultaneously on three terminal assemblies (only one of which, designated 30 has been shown), it will be necessary to describe the operation only in respect to a particular assembly 30. To prepare the terminal assembly 30 for the test operation, the piston 16 is actuated to raise the hood 12. The assembly 30 is placed in position upon the longitudinal ribs 42—42 and the piston 16 is actuated to clamp the hood 12 in place upon the rubber gasket 15 of the base plate 14. The cable stub 28 is allowed to protrude from the envelope 10 through the split bushing 27, and is connected to one of the flexible hoses 58—58 by a gripping device 57, which is operated in the manner heretofore described, to make a gas-tight connection.

Figure 6:
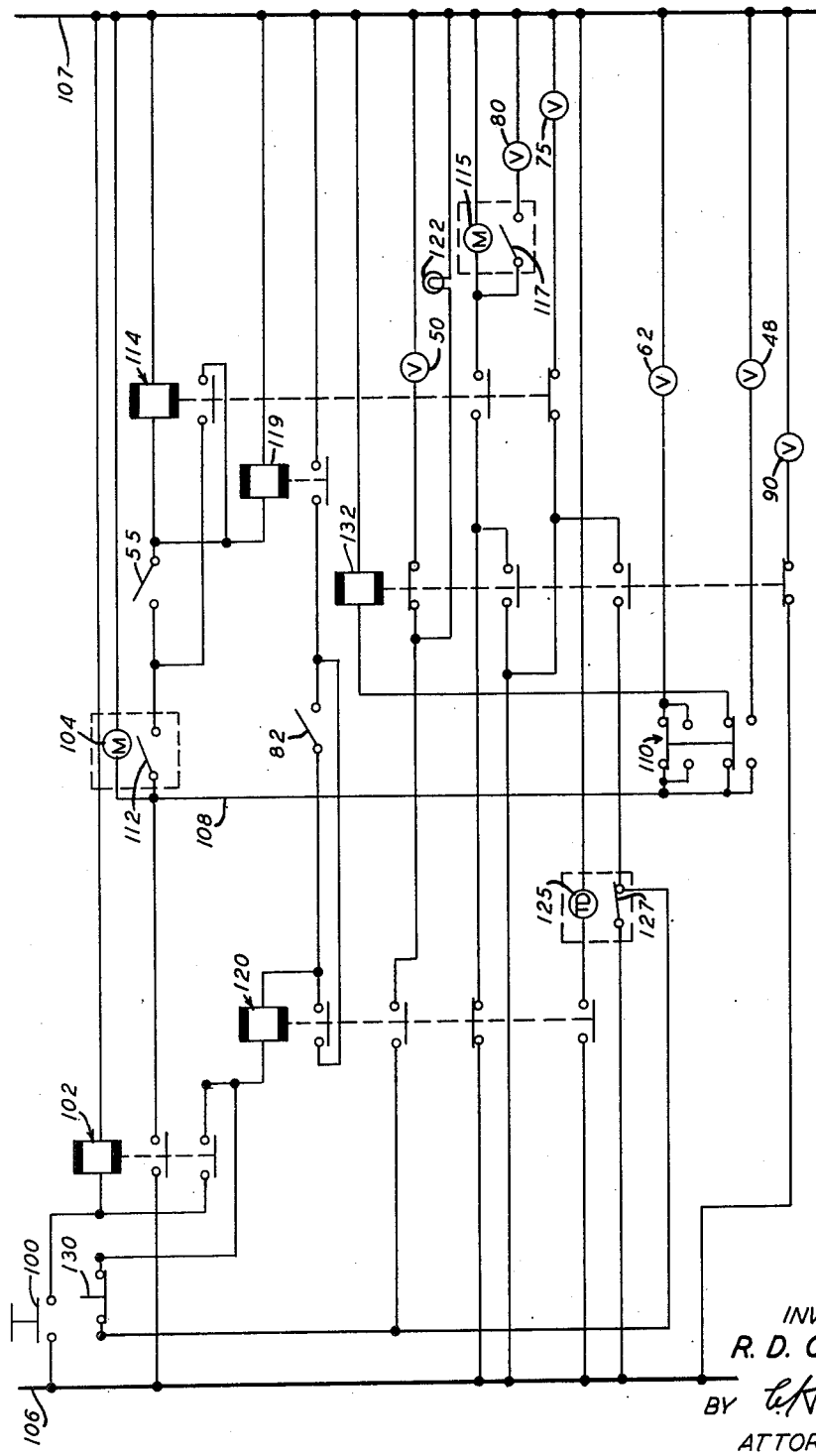
Fig. 6 is a schematic representation of an electrical circuit for the leak detecting apparatus.

To start the test on the terminal assembly 30, a push button 100 (Fig. 6) is actuated to its closed position, energizing the coil on a relay 102, which closes its contacts. This operation connects a timer motor 104 across bus lines 106 and 107, and also supplies potential from the bus line 106 to an intermediate bus line 108. The relay 102 maintains itself in an energized state by means of a contact on said relay after the push button 100 is released. The solenoid coil of the valve 75 is connected across the bus lines 106 and 107 and is energized when the bus lines are connected to a supply source (not shown).

A manually operable switch 110 is actuated after the operation of the push button 100 to connect the solenoid coils of the valves 62—62, 48—48 and 90—90 across the bus lines 107 and 108. The valves 48—48 and 62—62 are thereby actuated to their "open" positions, and connect the envelopes 10—10 and the cable stubs 28—28 to the vacuum pumps 52 and 74, respectively, which operate continuously during the test. Simultaneously, the meters 85—85 are connected through the now open valves 90—90 for indications of the pressure differential existing between the envelopes 10—10 and the cable stubs 28—28.

After a predetermined period of time the timer motor 104 closes a contact 112, and the pressure switch 55 in the line 43, set to operate when a vacuum of 29½" of mercury has been drawn by the pump 52, closes, connecting the solenoid coil of a relay 114 across the bus lines 106 and 107. Energization of the relay 114 de-energizes the valve 75, which assumes its normally closed position and disconnects the vacuum pump 74 from the pipe line 60 and cable stubs 28—28. The energization of the relay 114 also connects a timer motor 115, arranged to actuate a contact 117, across the bus lines 106 and 107, whereupon the motor 115 begins its timing cycle. The closing of the pressure switch 55 also energizes the solenoid coil of a relay 119, which closes its contact.

After a predetermined time the energized motor 115 closes its contact 117, thereby energizing the solenoid coil of the valve 80. The actuated valve 80 admits helium under pressure from the tank 77 into the pipe line 60 and thence to the cable stubs 28—28 through the open valves 62—62 and 63—63. Thereupon the vacuum in the pipe line 60 falls to 0" of mercury, and the pressure switch 82 is closed to connect the solenoid coil of a relay 120 across the bus lines 106 and 107.

The energized relay 120 opens a normally closed contact which de-energizes the solenoid coil of the valve 80, thereby closing said valve. The relay 120, which was energized when the switch 82 was actuated, connects an indicating lamp 122 across the bus lines 106 and 107 indicating that the valve 80 has been opened to admit helium gas into the terminal assembly 30, and also connects a timer motor 125, which operates a normally closed switch 127 across the bus lines 106 and 107. Energization of the relay 120 also connects the solenoid coil of the valve 50 across the bus lines 106 and 107, thereby opening the valve 50 to connect the intake port 45 on the mass spectrometer 46 to the envelopes 10—10.

The mass spectrometer is provided with its own vacuum pumps (not shown), which have been designed to draw a substantially greater vacuum within the spectrometer than that existing in the envelopes 10—10 and connecting exhaust line 43. Due to the differential pressure existing between the helium gas within the stubs 28—28 and the vacuum of 29½" of mercury existing in the envelopes 10—10, the helium gas introduced into the cable stubs 28—28 will tend to seep through any voids or openings that may be present in the resin surrounding the elements of a terminal assembly 30. This seepage of helium from a defective terminal assembly will be collected by the mass spectrometer 46.

Assuming that there are no defects in the terminal assembly 30, the vacuum pump 52 will continue to maintain the vacuum of 29½" of mercury within the envelopes 10—10 until the timer motor 125 opens the normally closed switch 127. Thereupon, the relays 102, 114, 119 and 120 are de-energized and the test lamp 122 is extinguished indicating that the test has been completed and that the terminal assembly is satisfactory. De-energization of the relay 102 closes the valve 48 and connects the envelopes 10—10 to the atmosphere. De-energization of the relay 114 causes the valve 75 to be actuated to its open position, which allows the vacuum pump 74 to extract the helium and air remaining in the pipe line 79 and connected cable stubs 28—28. The valve 50 is also deenergized and returns to its closed position, thereby disconnecting the mass spectrometer 46 from the exhaust line 43.

However, if the terminal assembly 30 under test proves to be imperfect (i. e. contains voids), helium gas will escape into the envelope 10, and as previously described, will be carried through the port 45 into the mass spectrometer 46. The presence of any helium gas so escaping from a defective terminal assembly 30 will be noted on the indicating means incorporated in the mass spectrometer 46. Whenever the presence of a leak in a terminal assembly 30 is indicated, the operator may terminate the testing operation by opening the normally closed switch 130 or allowing the timing device 125 to open the switch 127 and automatically terminate the testing operation.

Since the test is performed simultaneously on three terminal assemblies, it is necessary to determine the faulty assembly by a process of elimination. When the mass spectrometer 46 indicates that one of the terminal assemblies under test is defective, the operator stops the test, in the manner previously described, and closes one of the manually operated valves 63—63. The operator repeats the test on the terminal assemblies by actuating push button 100. On the repeat cycle, only two assemblies will be tested, since the helium is prevented from entering the terminal assembly 30 associated with the closed valve 63. If the test is completed without an indication of a leak, the terminal assembly 30, which was effectively disconnected during said test, is ascertained to be the defective assembly. However, if upon completion of the second test the mass spectrometer 46 still indicates a leak, another of the open valves 63—63 is closed and the test is again repeated. In this manner the faulty terminal assembly 30 may be separated from the non-defective assemblies. With the test completed, the piston 16 is operated to raise the hood 12, thereby permitting removal of the terminal assembly 30, which has previously been disconnected from the cable gripping device 57.

It is sometimes necessary to determine the approximate location of a defect in a terminal assembly that has been rejected after being tested in the manner previously described. The determination of a leak in the assembly is facilitated by the use of the probe 92. The cable stub 28 of the defective terminal assembly is connected to a clamping device 27 and the manually controlled valves 63—63 associated with the idle gripping devices 57—57 are closed. The switch 110 is moved to the closed position and the push button 100 is actuated. In the closed position of the switch 110, the coil of relay 132 is energized and in turn disconnects the circuit containing the solenoid coil of valve 50. This action prevents the valve 50 from opening during the probe test, when the relay 120 is actuated in a manner heretofore described.

As before, helium gas from the tank 77 is introduced to the cable stub 28 after the pump 74 has evacuated it. The supply of helium to the stub 28 during the probe test is continuous, since a closed contact on the relay 132 keeps the valve 80 open, even though the switch 82 has closed to operate the relay 120. The timing motor 125 and its associated switch 127 do not determine the length of the test. The test will continue even after the switch 127 is operated to its open position, since a contact on the energized relay 132 has effectively shunted the switch 127. Another contact on relay 132 opens the circuit containing the solenoid coils of valves 90—90 and de-energizes it, closing said valves 90—90 to disconnect the differential pressure meters 85—85. The valve 48 remains closed during the entire test, since the switch 110 de-energized its solenoid coil.

The probe 92 is used to scan the surface of the cable assembly. Any gas escaping via cracks and voids in the resin 37 will be collected by the probe 92 and led to the mass spectrometer 46 through the open valve 94. The mass spectrometer will give an indication of the presence of the helium gas, and in this manner, the location of the leak may be ascertained. The test is stopped by actuating the switch 130 to open the circuit containing relay 102, which de-energizes relays 114, 119, 120 and 132 to shut the valves 62—62 and 80.

It is understood that various modifications of this apparatus can be made within the scope of the invention.

What is claimed is:

1. An apparatus for detecting leaks in sealed articles, which comprises a base plate for supporting an article to be tested, a movable hood, means for clamping the hood upon the base plate to form a gas-tight chamber about an enclosed article, means for connecting the interior of the article to a supply of a probe gas, a pump for evacuating said chamber to create a substantial pressure differential between the probe gas within the article and the atmosphere within the chamber, a detector sensitive to the presence of the probe gas, means for placing the detector in communication with the chamber to indicate the presence of the probe gas, and means for raising the hood to remove the article upon completion of the test.

2. In an apparatus for detecting leaks in sealed articles, which comprises a base plate for supporting an article to be tested, a movable dome-shaped hood, a piston attached to said hood, fluid actuated means for actuating said piston to clamp the hood upon said base whereby a closed chamber is formed surrounding said article, means for introducing a probe gas into the interior of the article, a pump for evacuating said chamber to create a vacuum therein, a detector sensitive to the presence of the probe gas, means for placing the detector in communication with the chamber to indicate the presence of the probe gas therein, and means for operating the cylinder to raise the hood to allow the article to be removed.

3. In an apparaus for detecting leaks in sealed articles, which comprises a base plate upon which an article is placed, a rubber gasket mounted in said base plate, a movable dome-shaped hood, a piston attached at one end to said hood, a cylinder for receiving the opposite end of the piston, means for introducing fluid into one end of the cylinder to actuate the piston so as to clamp the hood tightly upon said gasket in the base plate, thereby forming a chamber containing the article, a supply of probe gas, a conduit communicating with the interior of said article, a valve for selectively connecting the supply to said conduit, means for exhausting the atmosphere within said chamber, a detector sensitive to the presence of the probe gas, means for placing the detector in communication with said chamber to indicate the presence of the probe gas therein, and means for introducing fluid into the opposite end of the cylinder to raise the hood upon completion of the test.

4. Apparatus for detecting leaks in sealed articles, which comprises a closed envelope surrounding such an article, an exhaust pump, a first solenoid operated valve for connecting the exhaust pump to the interior of the article, means for energizing the solenoid of said first valve, a vacuum pump, a second solenoid operated valve for connecting the vacuum pump to the interior of the closed envelope to exhaust the atmosphere in said envelope, means for energizing the solenoid of the second valve, a supply of a probe gas, a third solenoid operated valve for connecting the probe gas supply to the interior of the article, a time-delay relay operable at a predetermined time after the solenoid of the first valve has been energized to de-energize said solenoid and to energize the solenoid of the third valve, thereby disconnecting the exhaust pump from the article and introducing the probe gas into the interior thereof, a pressure-sensitive switch designed to close when the probe gas fills the article, a second relay actuatable when the pressure sensitive switch closes to de-energize the solenoid of the third valve, a detector sensitive to the presence of the probe gas, a fourth solenoid operated valve for connecting the detector to the interior of the envelope, and means operated by the second relay for energizing the solenoid of the fourth valve, thereby connecting the detector to the interior of the envelope for indicating the presence of any probe gas which may have escaped from the article under test into said envelope.

5. An apparatus for detecting leaks in sealed articles, which comprises a base plate upon which an article to be tested is supported, a movable hood, means for raising the hood to insert the article to be tested, means for clamping the hood upon the base plate to form a gas-tight chamber surrounding the article, a supply of probe gas, a conduit communicating with the interior of said article, a valve for selectively connecting the supply to said conduit for introducing the probe gas into the interior of said article, an exhaust pump, a valve for selectively connecting said exhaust pump to the conduit for exhausting gases that may be present within the article, an exhaust line communicating with the interior of the chamber, a vacuum pump connected to said exhaust line, a detector for indicating the presence of the probe gas, a valve for selectively connecting the detector to the exhaust line, whereby the presence of any probe gas in the atmosphere of the chamber will be indicated by said detector.

6. An apparatus for detecting leaks in sealed articles, which comprises a base plate upon which an article to be tested may rest, a movable hood, means for raising the hood to insert the article to be tested, means for clamping the hood upon the base plate to form a gas-tight chamber when the article has been placed in position upon said base plate, a supply of probe gas, a conduit communicating with the interior of said article, a solenoid operated valve for selectively connecting the supply to said conduit for introducing the probe gas into the interior of said article, an exhaust pump, a solenoid operated valve for selectively connecting said exhaust pump to the conduit for exhausting gases that may be present within the article, an exhaust line communicating with the interior of the chamber, a vacuum pump connected to said exhaust line, a detector for indicating the presence of the probe gas, a solenoid operated valve for selectively connecting the detector to the exhaust line, a solenoid operated valve for selectively connecting the exhaust line to the interior of said envelope and a circuit for controlling the sequence of operation of the aforementioned valves including a power supply, means for energizing the solenoid of the valve connecting the exhaust pump to the conduit thereby allowing the article to be exhausted, means for energizing the solenoid of the valve connecting the vacuum pump to the interior of the chamber thereby allowing a vacuum to be created within said chamber, a time-delay relay, operable at a predetermined time after the exhaust pump has been connected to the conduit, to de-energize the solenoid of the valve connecting the exhaust pump to the conduit and to energize the solenoid of the valve connecting the probe gas supply to said conduit, a pressure switch positioned in the conduit and operable to close a contact when the probe gas is introduced into said conduit, a second relay, which is operated, when the pressure switch closes the contact, to close the valve connecting the probe gas supply to the conduit and to energize the solenoid of the valve connecting the detector to the exhaust line to sample the gases within the chamber.

7. Apparatus for detecting leaks in sealed articles, which comprises a base plate for supporting an article to be tested, a hood, means for selectively raising and lowering the hood, said hood when lowered cooperating with the base plate to form a gas-tight chamber about an enclosed article resting on said base plate, means for connecting the interior of the article to a supply of a probe gas, a pump actuated when the hood is lowered for evacuating the chamber to create a substantial pressure differential between the probe gas within the article and the atmosphere within the chamber, a detector sensitive to the presence of the probe gas, and means for placing the detector in communication with the chamber to indicate the presence of the probe gas therein.

8. Apparatus for detecting leaks in sealed articles, which comprises a base plate for supporting an article to be tested, a hood, means for selectively raising and lowering the hood, said hood when lowered cooperating with the base plate to form a gas-tight chamber about an enclosed article resting on said base plate, means for connecting the interior of the article to a supply of a probe gas, a pump actuated when the hood is lowered for evacuating the chamber to create a substantial pressure differential between the probe gas within the article and the atmosphere within the chamber, a mass spectrometer sensitive to the presence of the probe gas, and means for placing the mass spectrometer in communication with the chamber to indicate the presence of the probe gas therein.

RICHARD D. GAMBRILL.

References Cited in the file of this patent

UNITED STATES PATENTS

| Number | Name | Date |
| --- | --- | --- |
| 2,486,199 | Nier | Oct. 25, 1949 |

OTHER REFERENCES

"Mass Spectrometer for Leak Detection," by Nier et al., published in Journal of Applied Physics, volume 18, January 1947, pages 30–33.

Chemical Engineering, volume 54, #4, April 1947, pages 112–114, by Burroughs.